United States Patent
Ooi (10) Patent No.: US 10,587,408 B2
(45) Date of Patent: Mar. 10, 2020

(54) DIGITAL ASSISTANT WATER MARK

(71) Applicant: MOTOROLA SOLUTIONS, INC, Chicago, IL (US)

(72) Inventor: Lee Sun Ooi, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 213 days.

(21) Appl. No.: 15/845,057

(22) Filed: Dec. 18, 2017

(65) Prior Publication Data

US 2019/0190715 A1    Jun. 20, 2019

(51) Int. Cl.
  *H04L 9/08* (2006.01)
  *H04L 9/32* (2006.01)

(52) U.S. Cl.
  CPC .............. *H04L 9/32* (2013.01); *H04L 9/0894* (2013.01); *H04L 2209/608* (2013.01)

(58) Field of Classification Search
  CPC ....... H04L 63/30–308; H04L 2209/608; H04L 9/32; H04L 9/0894; G06F 21/16; G06F 2221/0733; H04N 19/467; H04M 3/527; G10L 19/012
  See application file for complete search history.

(56) References Cited

U.S. PATENT DOCUMENTS

| | | | |
|---|---|---|---|
| 6,359,570 B1* | 3/2002 | Adcox | G07B 15/063 340/10.1 |
| 2004/0030900 A1 | 2/2004 | Clark | |
| 2008/0215333 A1 | 9/2008 | Tewfik et al. | |
| 2010/0315228 A1* | 12/2010 | Grilliot | G08B 21/04 340/540 |
| 2014/0082516 A1* | 3/2014 | Huang | G06F 3/0484 715/746 |
| 2015/0261753 A1 | 9/2015 | Winograd et al. | |
| 2016/0285492 A1* | 9/2016 | Vembar | H04W 4/70 |
| 2017/0263258 A1* | 9/2017 | Reitz | G10L 19/018 |

* cited by examiner

*Primary Examiner* — Daniel B Potratz
*Assistant Examiner* — Vu V Tran (57) ABSTRACT

A method and apparatus for providing a watermark within an audible virtual partner transmission is provided herein. During operation, each officer's digital partner will have a uniquely-identifiable watermark embedded within any audible transmission associated with the digital partner.

9 Claims, 4 Drawing Sheets

DIGITAL ASSISTANT WATER MARK

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) and/or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

In the public-safety realm, digital assistants are more commonly referred to as "virtual partners". Virtual partners often provide information to a user via an over-the-air communication directly to the officer's radio. In the situation of capturing audio evidence, it is very difficult to differentiate between a human on site, a dispatch operator, or a virtual partner. As audio quality continues to improve, it even becomes harder and harder to distinguish between "real" individuals and a virtual partner.

Expanding on the above, consider the example of a police officer recording an incident scene with a body-worn camera. Since the camera's field of view may be limited, a voice picked up by the camera's audio, yet not being visually recorded by the camera, may need to be identified at a later date. In this scenario, it is important to be able to differentiate between people on scene, a dispatch operator, or a virtual partner when listening to the recorded audio.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing a watermark within a virtual partner transmission is provided herein. During operation, each officer's virtual partner will have a uniquely-identifiable watermark embedded within any audible transmission associated with the virtual partner. The watermark will uniquely identify the virtual partner, the virtual partner/officer combination, and/or the officer who received the virtual-partner transmission.

A digital watermark is a kind of marker covertly embedded in the audio signal. It is used to identify a source of the audio signal. "Watermarking" is the process of hiding information (digital or analog) in the audio signal. Watermarks may be used to verify the identity of the virtual partner on any recorded audio.

In a preferred embodiment of the present invention, the watermark used for each virtual partner transmission comprises a particular frequency that is not audible to the human ear (e.g., frequencies over 20 kHz). Each virtual partner and/or officer/virtual partner pair will have an associated frequency that can be used to identify any transmission as belonging to a specific virtual partner and/or officer/virtual partner.

In other embodiments, other forms of watermarking may be utilized. For example, United States Publications Numbered 2015/0261753, US20040030900A1, and US20080215333A1 all describe various methods and techniques for embedding watermarks into various signals.

Regardless of the watermark used, it is assumed that any recording of the virtual partner's transmission will also record the watermark, which can then be used to forensically determine if the recorded audio was from a virtual partner.

Figure 1:
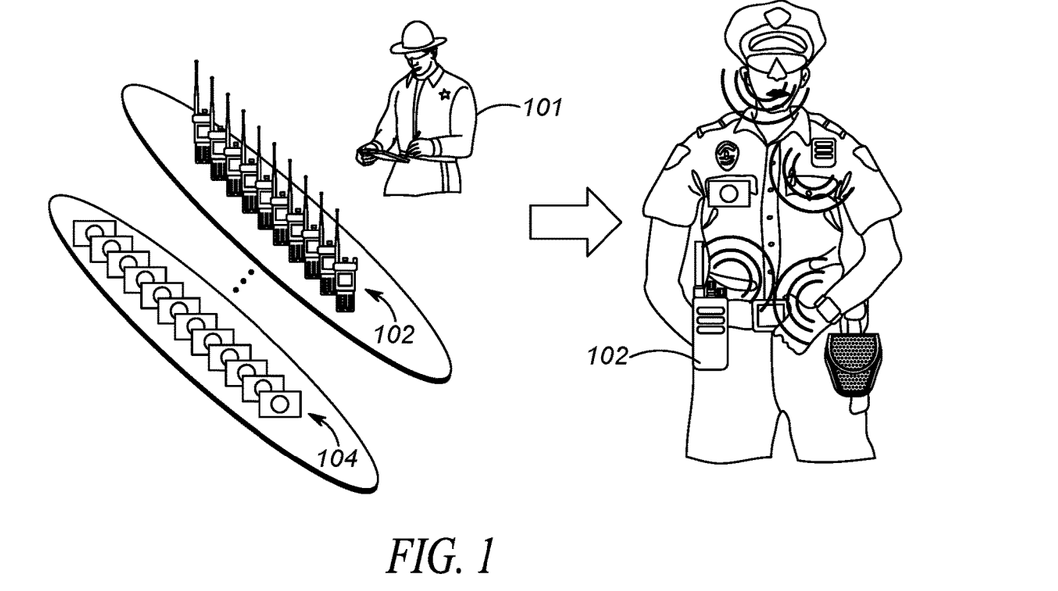
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, a biosensor, . . . , etc. All devices pulled by the officer will be configured to form a PAN by associating (pairing) with each other and communicating wirelessly among the devices. At least one device may be configured with a digital assistant. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
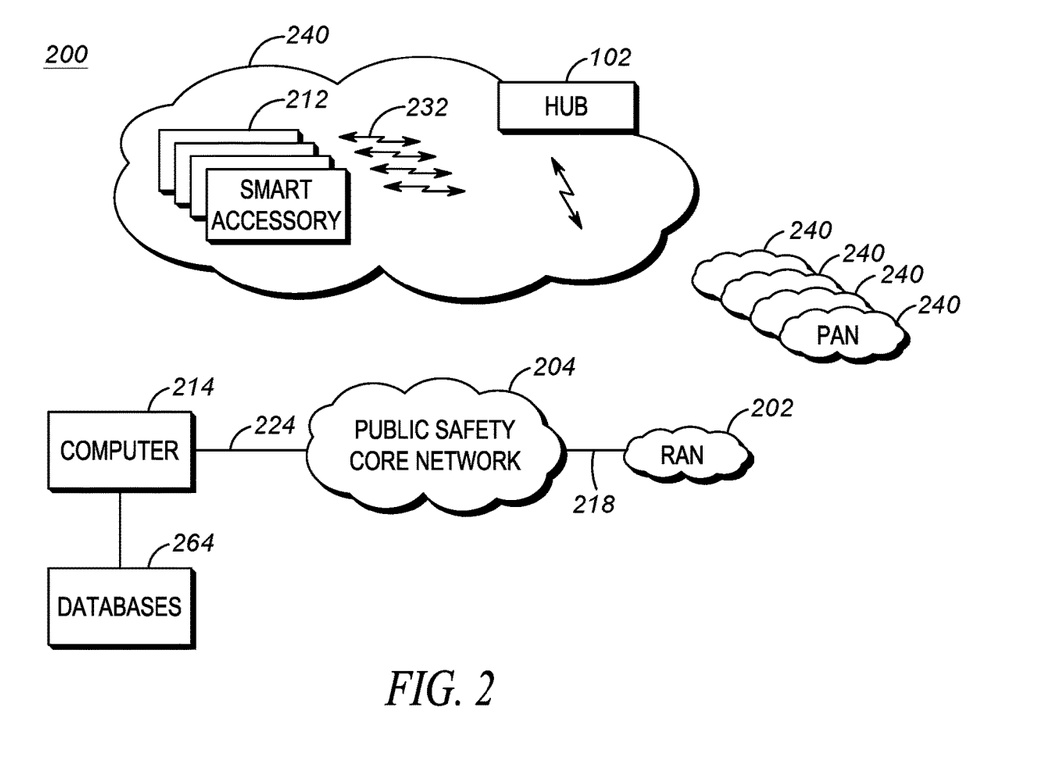
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN master device) 102, local devices (slave devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN master device, and may be any suitable computing and communication device configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information received from PAN devices to, for example, a dispatch center. The information can be forwarded to the dispatch center via RANs 202 based on a combination of device 212 inputs. In one embodiment, all information received from sensors 212 will be forwarded to computer 214 via RAN 202. In another embodiment, hub 102 will filter the information sent, and only send high-priority information back to computer 214.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc.

Computer 214 comprises, or is part of, a computer-aided-dispatch center (sometimes referred to as an emergency-call center), that may be manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214.

Computer 214 comprises a virtual partner (e.g., a microprocessor serving as a virtual partner/digital assistant) that is configured to receive sensor data from sensors 212, keep track of relevant information, and understand the situational context of user. The virtual partner will reactively provide officer-requested information, or may provide information automatically based one or more sensor status or triggers in which the virtual partner may proactively provide such valuable information to the user absent any explicit request from the user (e.g., "I see you have drawn your weapon, do you need assistance").

Expanding on the above, each user of the system may possess a hub with many associated devices forming a PAN. For each user of the system, computer 214 may track the user's current associated PAN devices (sensors 212) along with sensor data for that user. This information may be used to compile a summary for each user (e.g., equipment on hand for each user, along with state information for the equipment). The information is preferably stored in database 264. This information may be used by any virtual partner to provide valuable content to the user. As discussed, the content may be provided spontaneously, or in response to a query.

With the above in mind, computer 214 is also configured with a natural language processing (NLP) engine configured to determine the intent and/or content of the any over-the-air voice transmissions received by users. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 3:
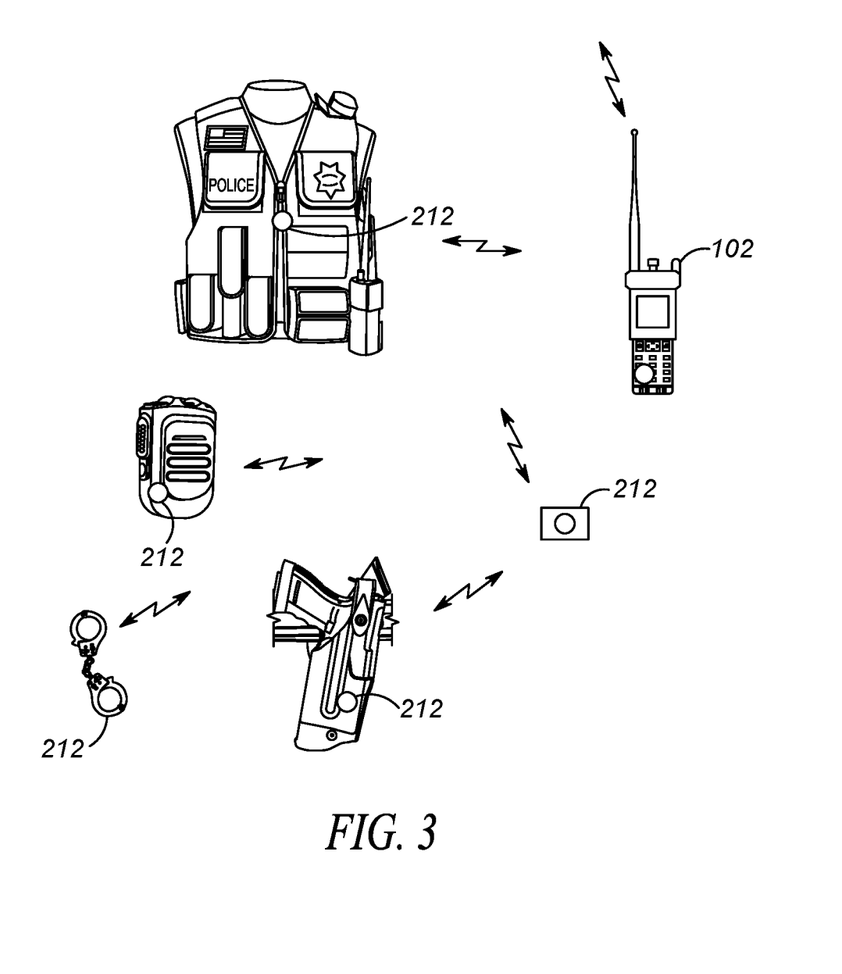
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and/or forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor information via a first network (e.g., Bluetooth PAN network), and forwards the information to computer 214 via a second network (e.g., a public safety wide area network (WAN)). When the virtual partner is located within computer 214, any request to the virtual partner will be made via the second network. In addition, any communication from the virtual partner to computer 214 will take place using the second network.

As described above, it may be difficult to differentiate radio reception received from a dispatch operator, an individual at the scene, or a virtual partner on recorded audio. In order to address the above-mentioned need, a method and apparatus for providing a watermark within an audible virtual partner transmission is provided herein. During operation, each officer's digital partner will have a uniquely-identifiable watermark embedded within any audible transmission associated with the digital partner. The watermark can be used to identify the identity of the virtual partner, the virtual partner/officer combination, and/or the officer who received the virtual-partner transmission.

Figure 4:
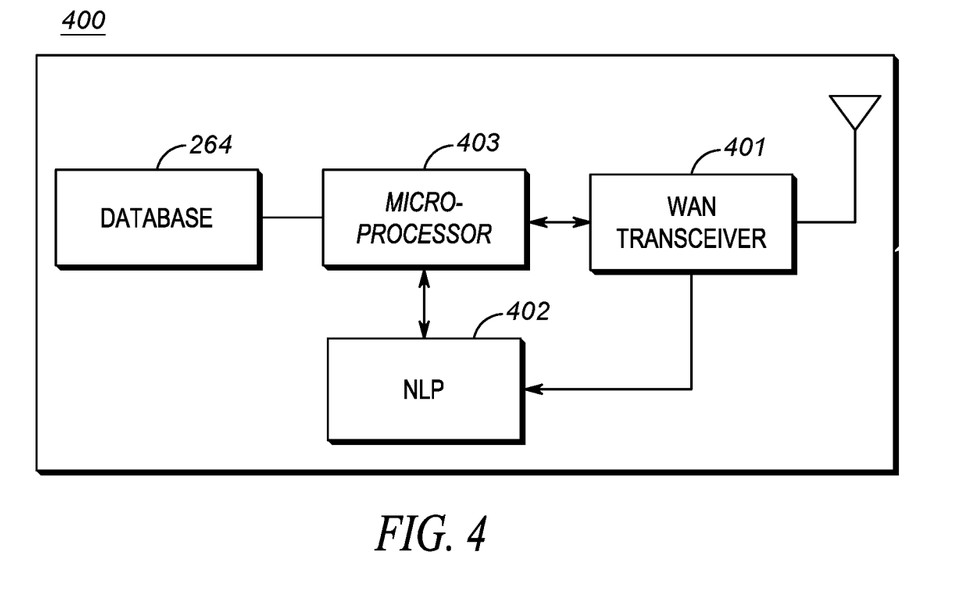
FIG. 4 is a block diagram of a dispatch center.

With the above in mind, FIG. 4 sets forth a schematic diagram that illustrates a device 400 for a digital assistant to map a particular watermark to a particular virtual partner and/or officer/virtual partner transmission. In an embodiment, the device is embodied within computer 214 (dispatch center 214), however in alternate embodiments the device may be embodied within the public-safety core network 204, or more computing devices in a cloud compute cluster (not shown), or some other communication device not illustrated in FIG. 2, and/or may be a distributed communication device across two or more entities. In this particular embodiment, device 400 may receive multiple queries from multiple officers, and provide virtual partner transmissions in response, each having its own unique watermark that uniquely identifies the virtual partner, the virtual partner/officer combination, and/or the officer who received the virtual-partner transmission.

FIG. 4 shows those components (not all necessary) for device 400 to map a particular watermark to a virtual partner and/or an officer/virtual partner combination. For ease of illustration some components have been left out of FIG. 4. For example, a graphical user interface that provides the dispatch operator necessary information about public-safety officers is not shown since that component is not necessary for understanding the following discussion.

As shown, device 400 may include a wide-area-network (WAN) transceiver 401 (e.g., a transceiver that utilizes a public-safety communication-system protocol), Natural Language Processor (NLP) 402, logic circuitry 403 (which may serve as a digital assistant), and database 264. In other implementations, device 400 may include more, fewer, or different components. Regardless, all components are connected via common data busses as known in the art.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 receives communications from users, as well as sensor data from users. It should be noted that WAN transceiver 401 is shown as part of device 400, however, WAN transceiver 401 may be located in RAN 202 (e.g., a base station of RAN 202), with a direct link to device 400.

NLP 402 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 403 comprises a digital signal processor (DSP), general purpose microprocessor, a programmable logic device, or application specific integrated circuit (ASIC) and is configured (along with NLP 402) to serve as a digital assistant/virtual partner to users of the system. For example, logic circuitry may provide a user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers (i.e., the joining of a talkgroup, a sensor status, ..., etc.) in which the electronic digital assistant may proactively provide such valuable information to the user absent any explicit request from the user.

With the above in mind, and as an example, device 400 (logic circuitry) may be continuously compiling a history of user's associated PAN sensors and their status, along with any incident assigned to users. This information is received by WAN transceiver 401 and may be stored in database 264. Hub 102 may send a query to device 400 (e.g., to computer 214 when device 400 is embodied within computer 214, the query received by WAN transceiver 401). Such a query may be something as simple as "advice please", or may be more specific, such as, "Please give me advice on how to handle this heart-attack victim". Alternatively, no query may be sent, and device 400 may simply provide information unsolicited (e.g., based on received sensor information). Device 400 may send a response to hub 102 (using WAN transceiver 401) as part of a virtual partner transmission. As discussed above, the response will have an embedded audio watermark.

Database 264 is provided. Database 264 comprises standard memory (such as RAM, ROM, ..., etc) and serves to store user identifications along with associated hubs 102, their PAN device statuses (device states), and any incident assigned to the hub (user of the hub). As an example, PAN state information may comprise a battery level, ammunition level, RF signal strength, inventory of emergency aid such as adrenaline shots, gauze, a loudness of any query, whether or not a gun has been drawn, ..., etc. Incidents assigned to a hub may take the form of any public-safety incident, such as, but not limited to, robberies, burglaries, murders, homicides, assaults, traffic stops, ..., etc.

Database 264 also comprises a table of officers, officer/virtual partner combinations, virtual partners and their associated watermarks. This is illustrated below in Table 1, Table 2, and Table 3.

Table 1 illustrates watermarking that is based solely on where the virtual partner's transmission is being sent (i.e., what officer is to receive the transmissions).

TABLE 1

| Virtual Partner/Officer Watermarks | |
|---|---|
| Officer to receive VP transmission | Watermark Used |
| Adams | Watermark 1 |
| Brooks | Watermark 2 |
| Cassidy | Watermark 3 |
| ... | ... |
| Young | Watermark N |

As shown above, any virtual partner transmission to a particular officer will have a particular watermark embedded within it. As shown above, all virtual partner transmissions to Officer Adams will have Watermark 1 embedded within it. As discussed above, watermark 1 may comprise a sub-audible tone that is not audible to the human ear. So, for example, watermark 1 may comprise a first tone (e.g., 20.5 kHz), watermark 2 may comprise a second tone (e.g., 21 kHz), while watermark 3 may comprise a third tone (e.g., 21.5 kHz).

In another embodiment of the present invention a unique watermark may be provided to an officer/virtual partner combination so that each particular combination will have a unique watermark. For example, a first virtual partner persona (e.g., Fred) will have a first embedded watermark when communicating with Officer Adams, while a second virtual partner persona (e.g., Mary) will have a second embedded watermark when communicating with Officer Adams. Similarly, Virtual partner Mary will have a third embedded watermark when communicating with, for example, Officer Brooks. This is illustrated in Table 2.

TABLE 2

Watermarks for Officer/VP combination

| Officer/VP | Watermark |
| --- | --- |
| Adams/Fred | Watermark 1 |
| Adams/Mary | Watermark 2 |
| Brooks/Fred | Watermark 3 |
| Brooks/Mary | Watermark 4 |
| ... | ... |
| Young/Mary | Watermark N |

In yet a further embodiment of the present invention, each virtual partner will have a unique watermark, independent of what officer receives the virtual-partner transmissions. This is shown in Table 3.

TABLE 3

Unique Watermarks for Each Virtual Partner

| Virtual Partner | Watermark |
| --- | --- |
| Fred | Watermark 1 |
| Mary | Watermark 2 |
| Nancy | Watermark 3 |
| Paul | Watermark 4 |
| ... | ... |

It should be noted that the above description had the digital assistant functionality encompassed within dispatch center 214. In an alternate embodiment this functionality may be encompassed within hub 102.

Figure 5:
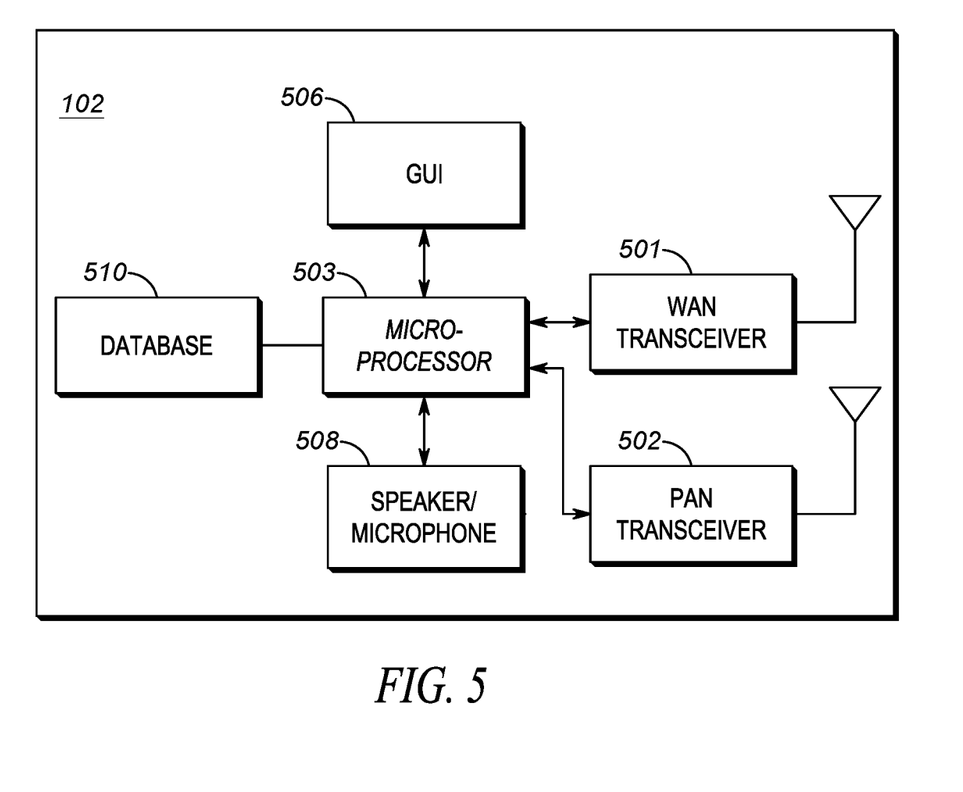
FIG. 5 is a block diagram of a hub.

FIG. 5 is a block diagram of a Hub. As shown, hub 102 includes a wide-area-network (WAN) transceiver 501 (e.g., a transceiver that utilizes a public-safety communication-system protocol), PAN transceiver 502 (e.g., a short-range transceiver), Graphical User Interface (GUI) 506, database 510, logic circuitry 503, speaker 508. In other implementations, hub 102 may include more, fewer, or different components. For example, if digital-assistant functionality is being provided by hub 102, then a NLP may be present.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 provides sensor status updates to dispatch center 214. WAN transceiver 501 additionally will provide voice communication between the officer operating hub 102 and the dispatch center 214. The voice communication may be simple push-to-talk communication to a dispatch operator over a talkgroup, or may be a communication to a virtual partner housed within dispatch center 214 (potentially over a unique virtual-partner talkgroup). WAN transceiver 501 will also receive any virtual-partner communications frim dispatch center 214.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network. PAN transceiver forms the PAN (acting as a master device) with various sensors 212.

GUI 506 comprises provides a way of displaying information and receiving an input from a user. For example, GUI 506 may provide a way of conveying (e.g., displaying) information to a user regarding that status of devices 212.

Speaker/microphone 508 provides audible information generated by any digital assistant (e.g., a voice) along with sub-audible watermarks. Speaker/microphone 508 may receive queries from a user and provide the queries to the dispatch center using an over-the-air network and WAN transceiver 501.

Logic circuitry 403 comprises a digital signal processor (DSP), general purpose microprocessor, a programmable logic device, or application specific integrated circuit (ASIC) and is configured to determine when to transmit sensor information to the dispatch center.

Database 510 comprises standard memory (such as RAM, ROM, . . . , etc) and serves to store PAN member names (identifications), their statuses, and any incident assigned to hub 102. So, for example, database 510 may comprise a list of PAN members (long gun, bullet-proof vest, gun-draw sensor, accelerometer, . . . , etc.) that formed a PAN with hub 102. Database 510 also stores status information for each sensor (e.g., long gun in use, bullet-proof vest being worn, dun-draw sensor indicating a gun is holstered, . . . , etc.). Database 510 may also comprise a table of officers, officer/virtual partner combinations, virtual partners and their associated watermarks. This is illustrated below in Table 1, Table 2, and Table 3 if hub 102 is serving as a virtual partner.

During operation, an over-the-air virtual-partner transmission is received by WAN transceiver 501 and demodulated/decoded. Microprocessor 503 provides the audible output to speaker 508 so that a user of device 102 may receive the audible output of any virtual-partner transmission from the dispatch center. Any audible output of a virtual-partner transmission will comprise a sub-audible watermark that uniquely identifies the virtual partner, the virtual partner/officer combination, and/or the officer who received the virtual-partner transmission. Alternatively, when hub 102 is serving as a virtual partner, the virtual partner transmission may be generated by hub 102 instead of dispatch center 214.

As discussed above, dispatch center 214 and/or hub 102 maps the virtual partner, the virtual partner/officer combination, and/or the officer who received the virtual-partner transmission to a particular watermark. The mapping may be explicit based on predefined rules.

Figure 6:
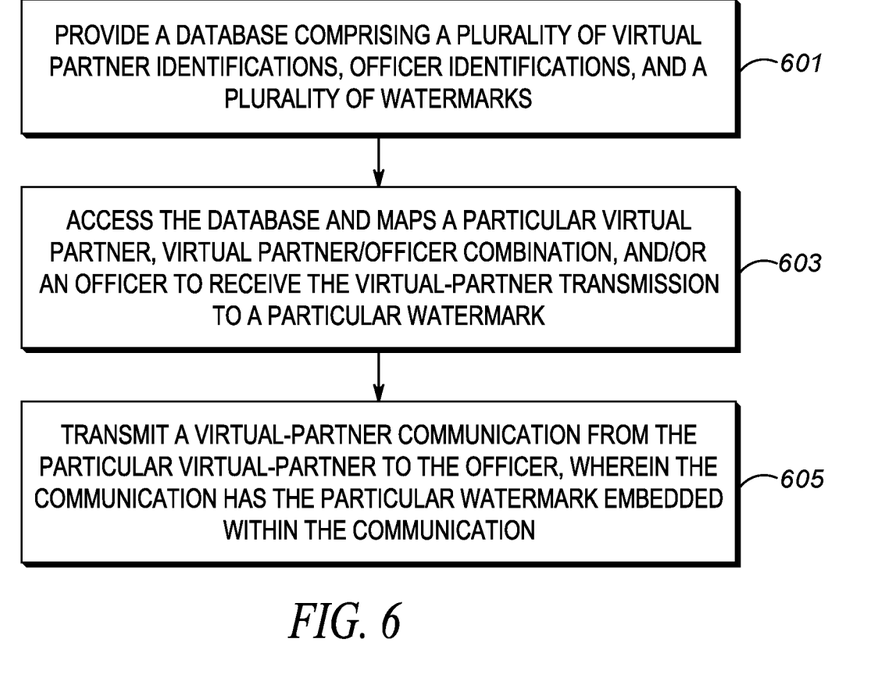
FIG. 6 is a flow chart for mapping a particular virtual partner, virtual partner/officer combination, and/or an officer to receive the virtual-partner transmission to a particular watermark.

FIG. 6 is a flow chart for mapping a particular virtual partner, virtual partner/officer combination, and/or an officer to receive the virtual-partner transmission to a particular watermark. The logic flow begins at step 601 where there is provided a database comprising a plurality of virtual partner identifications, officer identifications, and a plurality of watermarks. As discussed above, the database may comprise database 264 if the dispatch center is providing virtual partner services, and/or database 264 if the hub is providing dispatch services. Regardless, the database may be pre-populated by a user, or generated automatically by a microprocessor.

At step 603 logic circuitry accesses the database and maps a particular virtual partner, virtual partner/officer combination, and/or an officer to receive the virtual-partner transmission to a particular watermark. Finally, at step 605 a transceiver is utilized to transmit a virtual-partner communication from the particular virtual-partner to the officer, wherein the communication has the particular watermark embedded within the communication.

As discussed above, the particular watermark may comprise a sub-audible tone, and uniquely identifies the virtual partner, virtual partner/officer combination, and/or an officer to receive the virtual-partner transmission.

The above logic flow provides for an apparatus comprising a database comprising a plurality of virtual partner identifications, a plurality of watermarks, and/or a plurality of officer identifications. The logic circuitry accessing the database and mapping a particular virtual partner to a particular watermark. Transmission circuitry is provided for transmitting a virtual-partner communication from the particular virtual-partner to an officer, wherein the communication has the particular watermark embedded within the communication.

The above logic circuitry also provides for an apparatus comprising a database comprising a plurality of virtual partner identifications, a plurality of officer identifications, and a plurality of watermarks. Logic circuitry is provided for accessing the database and mapping a particular virtual partner/officer combination to a particular watermark. Finally, transmission circuitry is provided for transmitting a virtual-partner communication from the particular virtual-partner to the officer, wherein the communication has the particular watermark embedded within the communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. An apparatus comprising:
 a database comprising a plurality of electronic digital assistant identifications and a plurality of watermarks;

logic circuitry accessing the database and mapping a particular electronic digital assistant to a particular watermark; and transmission circuitry transmitting a virtual-partner communication from the particular electronic digital assistant to an officer, wherein the communication has the particular watermark embedded within the communication;

wherein the particular electronic digital assistant comprises software applications running on underlying electronic hardware that are capable of understanding natural language, and can complete electronic tasks in response to user voice inputs, among other additional or alternative types of inputs.

2. The apparatus of claim 1 wherein the particular watermark comprises a sub-audible tone.

3. The apparatus of claim 1 wherein the particular watermark uniquely identifies the particular electronic digital assistant.

4. An apparatus comprising:
a database comprising a plurality of electronic digital assistant identifications, a plurality of officer identifications, and a plurality of watermarks;

logic circuitry accessing the database and mapping a particular electronic digital assistant/officer combination to a particular watermark; and transmission circuitry transmitting a virtual-partner communication from the particular electronic digital assistant to the officer, wherein the communication has the particular watermark embedded within the communication;

wherein the particular electronic digital assistant comprises software applications running on underlying electronic hardware that are capable of understanding natural language, and can complete electronic tasks in response to user voice inputs, among other additional or alternative types of inputs.

5. The apparatus of claim 4 wherein the particular watermark comprises a sub-audible tone.

6. The apparatus of claim 4 wherein the particular watermark uniquely identifies the particular electronic digital assistant/officer combination.

7. A method comprising the steps of:
providing a database comprising a plurality of electronic digital assistant identifications and a plurality of watermarks;

accessing the database and mapping a particular electronic digital assistant, electronic digital assistant/officer combination, and/or an officer to receive a virtual-partner transmission to a particular watermark; and transmitting a virtual-partner communication from the particular electronic digital assistant to the officer, wherein the communication has the particular watermark embedded within the communication, wherein the particular electronic digital assistant comprises software applications running on underlying electronic hardware that are capable of understanding natural language, and can complete electronic tasks in response to user voice inputs, among other additional or alternative types of inputs.

8. The method of claim 7 wherein the particular watermark comprises a sub-audible tone.

9. The method of claim 7 wherein the particular watermark uniquely identifies the particular electronic digital assistant, electronic digital assistant/officer combination, and/or an officer to receive the virtual-partner transmission.

* * * * *